US007353070B2

(12) United States Patent
Landou et al.

(10) Patent No.: US 7,353,070 B2
(45) Date of Patent: Apr. 1, 2008

(54) BUILDING CONTROL SYSTEM USING NETWORK GLOBAL DATA

(75) Inventors: Bruno P. Landou, Elmhurst, IL (US); Joseph F. Vitaterna, Northbrook, IL (US); Robert L. Old, Jr., Lindenhurst, IL (US); Robert Gaffaney, Algonquin, IL (US); Robert Kalafut, Downers Grove, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 118 days.

(21) Appl. No.: 10/952,489

(22) Filed: Sep. 27, 2004

(65) Prior Publication Data

US 2005/0182498 A1 Aug. 18, 2005

Related U.S. Application Data

(60) Provisional application No. 60/506,456, filed on Sep. 25, 2003.

(51) Int. Cl.
*G05B 11/01* (2006.01)
*G06F 15/167* (2006.01)

(52) U.S. Cl. .................. 700/19; 709/213; 709/214

(58) Field of Classification Search .............. 700/83, 700/17, 20, 19, 79; 709/213, 214
See application file for complete search history.

(56) References Cited

U.S. PATENT DOCUMENTS

| 5,086,385 | A | * | 2/1992 | Launey et al. ............. 700/83 |
| 5,621,662 | A | * | 4/1997 | Humphries et al. ......... 700/276 |
| 6,104,963 | A | * | 8/2000 | Cebasek et al. ............ 700/86 |
| 6,185,466 | B1 | * | 2/2001 | Nicewonger .............. 700/19 |
| 6,389,331 | B1 | * | 5/2002 | Jensen et al. ............. 700/275 |
| 2002/0016639 | A1 | * | 2/2002 | Smith et al. .............. 700/9 |
| 2002/0078174 | A1 | * | 6/2002 | Sim et al. ............... 709/219 |
| 2003/0083758 | A1 | * | 5/2003 | Williamson ............... 700/65 |

* cited by examiner

*Primary Examiner*—Thomas K. Pham

(57) ABSTRACT

An arrangement in a building control system includes a plurality of field panel devices. Each field panel device is configured to receive control inputs and further configured to provide control outputs to at least one building control device. Each field panel device includes a data store, a communication circuit, and a processing circuit. The data store maintains a set of global data that is shared by all field panel devices. The communication circuit is operably connected to others of the plurality of field panel devices via a logical network. The processing circuit is operable to communicate changes of any of the set of global data to at least one other field panel device via the communication circuit.

35 Claims, 8 Drawing Sheets

BUILDING CONTROL SYSTEM USING NETWORK GLOBAL DATA

The present application claims priority to U.S. Provisional Patent Application Ser. No. 60/506,456, filed Sep. 25, 2003, which is incorporated herein by reference.

FIELD OF THE INVENTION

The present invention relates generally to building control systems, and more particularly, to building control systems that include field panel control devices.

BACKGROUND OF THE INVENTION

Building control systems are employed to regulate and control various environmental and safety aspects of commercial, industrial and residential facilities (hereinafter referred to as "buildings"). In ordinary single-family residences, control systems tend to be simple and largely unintegrated. However, in large buildings, building control systems often consist of multiple, integrated subsystems employing hundreds of elements.

For example, a heating, ventilation and air-conditioning ("HVAC") building control system interrelates small, local control loops with larger control loops to coordinate the delivery of heat, vented air, and chilled air to various locations throughout a large building. Local control systems, for example, open and close vents that supply heated or chilled air based on local room temperature readings. Larger control loops, for example, obtain many distributed temperature readings and/or air flow readings to control the speed of a ventilation fan, or control the operation of heating or chilling equipment.

As a consequence of the interrelationship of these control loops, many elements of a building control system must communicate information to each other. To this end, communication networks have been incorporated that transmit digital data between and among the various elements in accordance with one or more sets of protocols.

Some of the core elements of a sophisticated building control systems include field panel devices, supervisory control stations, sensors and actuators. Sensors and actuators are terminal devices of the system that collect raw data and physically change output of the system, respectively. For example, sensors may include temperature sensors, humidity sensors, air flow sensors and the like. Actuators may change the physical output of fans, ventilation dampers, air conditioning equipment and the like. Field panel devices are distributed control devices that in large part determine the operation of the system, at least at local levels. To this end, field panel devices may receive sensor signals from the sensors and provide control signals to the actuator. The field panel devices generate such control signals based on the sensor signals and other control signals, such as set point signals received from other field panel devices and/or the control station. The control station is typically a computer having a human user interface that allows for human technicians to monitor and control overall system operation.

In such systems, the field panel devices are generally connected to each other as well as to the one or more control systems in order to share information necessary for coherent building control. In the past, such devices shared data over a token ring network, which are relatively simple to implement on a logical level.

However, specialized token ring networks can be costly to install, as they generally require separate, specialized network infrastructure.

There is a need, therefore, for a building control system that reduces the need for additional specialized network infrastructure.

SUMMARY OF THE INVENTION

The present invention addresses the above needs, as well as others, by providing an arrangement of field panel devices that communicate via logical IP standard communication networks and systems. As a consequence, an existing Ethernet or local area network infrastructure may be used to provide the network connections between field panel devices and/or other building control system elements. Moreover, the arrangement may communicate over several local area networks if necessary. Even if an existing Ethernet infrastructure is not available, an Ethernet standard communication network is typically easier and/or less costly to install because the installation of such standard networks is widely known. Moreover, global data may readily be shared over such a logical IP network in accordance with aspects of the invention.

A first embodiment of the invention is an arrangement in a building control system that includes a plurality of field panel devices. Each field panel device is configured to receive control inputs and further configured to provide control outputs to at least one building control device. Each field panel device includes a data store, a communication circuit, and a processing circuit. The data store maintains a set of global data that is shared by all field panel devices. The communication circuit is operably connected to others of the plurality of field panel devices via a logical network. The processing circuit is operable to communicate changes of any of the set of global data to at least one other field panel device via the communication circuit.

A second embodiment of the invention is a field panel designed for use in such an arrangement. Several other embodiments of the invention, some of which include independent inventive aspects, are described herein.

The above described features and advantages, as well as others, will become more readily apparent to those of ordinary skill in the art by reference to the following detailed description and accompanying drawings.

DETAILED DESCRIPTION

Figure 1:
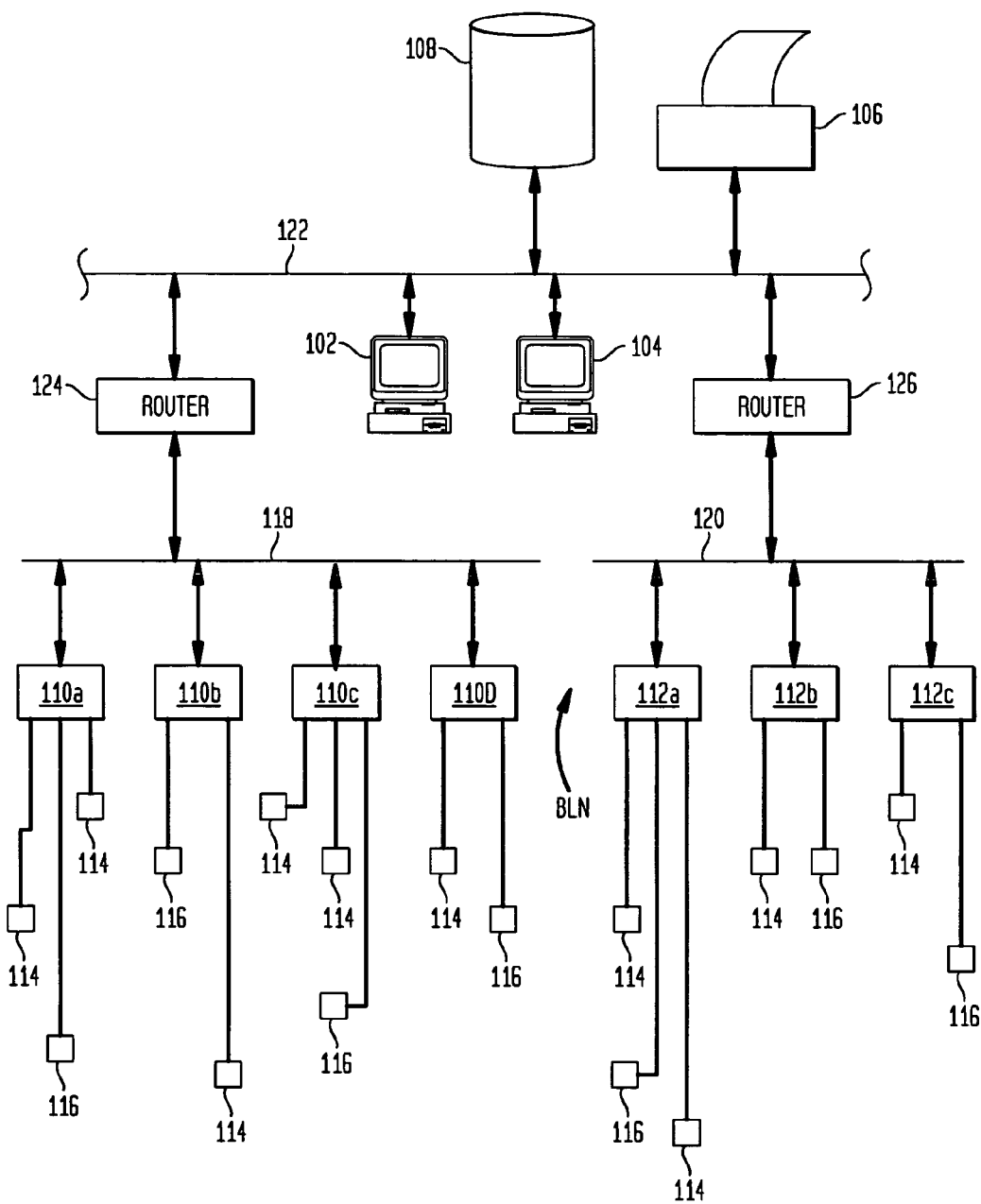
FIG. 1 shows a schematic block diagram of a building control system that incorporates aspects of the invention.

FIG. 1 shows an exemplary building control system 100 that incorporates aspects of the invention. The building control system 100 includes first and second control system computers 102, 104, a system printer 106, a system mass storage device 108, a first set of field panel devices 110, a second set of field panel devices 112, and plural control system devices 114 and 116.

The control system devices 114 include sensors that obtain values representative of a process value within the building control system 100. For example, control system devices 114 may include temperature sensors, flow sensors, humidity sensors, air quality sensors. The control system devices 116 include actuators that affect outputs of the building control system 100. For example, the control system devices 116 may include ventilation damper actuators, hot water valve actuators, variable frequency drives, and other devices that can affect temperature, air flow or other aspects of a building.

The control system device 114 and 116 are connected to various of the first and second sets of field panel devices 110 and 112, respectively. The first set of field panel devices includes field panel devices 110a, 110b, 110c and 110d, which are all connected to each other by an Ethernet local area network 118. The second set of field panel devices 112 includes field panel devices 112a, 112b and 112c, which are all connected to each other by an Ethernet local area network 120.

The Ethernet local area networks 118 and 120 are bus networks to which the field panel devices 110a-d and 112a-c, respectively are connected. Other nodes, not shown, may also be connected to the Ethernet local area networks 118 and 120. The Ethernet local area networks 118 and 120 employ Ethernet standard transmission protocol, including standard Ethernet acknowledgement practices (in one-to-one or unicast messaging), standard Ethernet multicast and broadcast practices, and standard collision handling operations. Ethernet networks in general are well known.

The control stations 102, 104, the printing device 106 and the mass storage device 108 are all connected by another Ethernet network 122. The Ethernet network 122 is a bus network similar to the Ethernet local area networks 118 and 120. The Ethernet local area network 118 is connected to the Ethernet network 122 through a router 124. Similarly, the Ethernet local area network 120 is connected to the Ethernet network 122 through a router 126.

Each of the field panels 110a-110d and 112a-112c is preferably operable to receive sensor information from one or more building control devices 114, receive set point or other control information from an external device (such as another field panel 110a-110d, 112a-112c or a control station 102, 104), and generate a control output therefrom. Each field panel 110a-110d and 112a-112c is preferably also operable to generate a control output from the sensor information and/or the set point or other control information. The field panels 110a-110d and 112a-112c may suitably communicate the control outputs to building control devices 116 and/or other of the field panels. The field panels 110a-110d an 112a-112c are also preferably operable to communicate sensor information, set point information, control output values, device status information, field panel status information and the like to one or more of the control stations 102 and 104.

An exemplary embodiment of a field panel which may be used as any of the field panels 110a-110d and 112a-112c is discussed below in connection with FIGS. 2 and 3.

The control stations 102, 104 are preferably computer workstations that include user interface equipment such as displays, keyboards, pointing devices, etc. The control stations 102, 104 provide overall control and monitoring functions for the system 100, including providing user access to data generated by or for the field panels 110a-110d, 112a-112c. By way of example, the control station 102, 104 may be able to obtain a sensor reading, for example a temperature sensor reading, from the field panel 110b in response to a request by a user. In another example, the control station 102 may be able to provide a set point flow value to one of the field panels, e.g. field panel 112c, which the field panel 112c would then use in determining a control output to provide to the appropriate actuator. As is known in the art, alarm information generated by any of the control devices 114, 116 or any of the field panels 110a-110d, 112a-112c may be received and displayed at the control stations 102, 104.

One example of a suitable control station is an Insight™ brand workstation available for use in the Apogee™ building control system, both available from Siemens Building Technologies, Inc., of Buffalo Grove, Ill.

The mass data store 108 is a device that stores system related data in one or more databases. The stored system-related data may include historical and statistical information regarding system operation, system configuration information, system graphics, as well as other information not necessarily used in the real-time (or substantially real-time) control operations of the field panels 110a-110d, 112a-112c.

In the exemplary structure of FIG. 1, the field panels 110a-110d and 112a-112c, the control stations 102 and 104, and optionally the mass storage device 108 are part of a logical building level network, referred to herein as the BLN. The BLN, as is known in the art, logically connects various elements of a building control system so that they may communicate with each other. In general, a BLN may or may not implement multiple physical layer networks. In the embodiment described herein, the BLN employs as physical layer networks the LANs 118 and 120 as well as the LAN 122.

The field panels 110a-110d and 112a-112c and the control stations 102 and 104 are nodes on the BLN. The BLN may contain several other nodes, not shown. The nodes of the BLN in the embodiment described herein employ Internet Protocol (IP) as the basis for communication between each other. As is known in the art, multiple IP level networks may share a physical level network. Accordingly, the BLN may suitably share the LANs 118, 120 and 122 with multiple other logical networks. Even multiple BLNs may share one or more physical layer networks.

As will be discussed below, the invention described herein allows for organization of field panels and propagation of global data in a wide variety of logical and physical network configurations.

In accordance with aspects of at least some embodiments of the invention, the use of IP communication networks for the field panels allows for ready communication between and among the field panels 110a-110d and the field panels 112a-112c, taking advantage of existing (or easily added) Ethernet network infrastructure. Moreover, the IP level BLN can take advantage of multiple Ethernet networks connected by routers, such as is shown by way of example in FIG. 1. Communication between field panels and control stations is important in building control systems because control information, sensor information and even control outputs are often shared among the various field panels and control stations in the system.

In accordance with other aspects of the invention, the communication capabilities described herein allow each of the field panels 110a-110d and the field panels 112a-112c to maintain global data that is common to all field panels. Global data is system-wide data that each "node" (i.e. nodes 110a-110d, 112a-112c, 102 and 104) within the BLN maintains. Examples of global data may include a list of the nodes on the BLN and a list of authorized users that can effect changes to the building control system. Other examples of global data are discussed further below. When a field panel, a control station 102, 104, or other node makes changes to the global data, the change must be communicated to all field panels and other nodes so that each node of the BLN has the same global data.

In accordance with aspects of the present invention, each field panel that receives a global data update propagates the update to a number of "partner" field panels. For example, the field panel 110a may have partner field panels 110b and 112a to which it would transmit any updates to global data. Those field panels 110b and 112a would then retransmit the same global data update to their partner field panels, and so forth. Ideally, no field panel (or other node) receives the same update message twice. To this end, the nodes on the BLN use metadata to determine whether their global data replica needs to further propagate new updates. One aspect of this embodiment of the invention is that all nodes calculate their "partners" from the same node list, using the same algorithm, so that propagation to all nodes can be guaranteed.

It is noted that in the embodiment described above, global data is shared by the first set of field panels 110a-d and the second set of field panels 112a-c (as well as other nodes such as control stations 102 and 104), even though the field panels are on different networks 118 and 120, respectively. It will be appreciated that the first set of field panels 110a-d and the second set of field panels 112a-c may communicate with each other through the routers 124 and 126 and the Ethernet network 122. To this end, the field panels 110a-110d and 112a-112c employ a TCP/IP transport and network layer protocol to communicated on the BLN, as discussed above.

Figure 2:
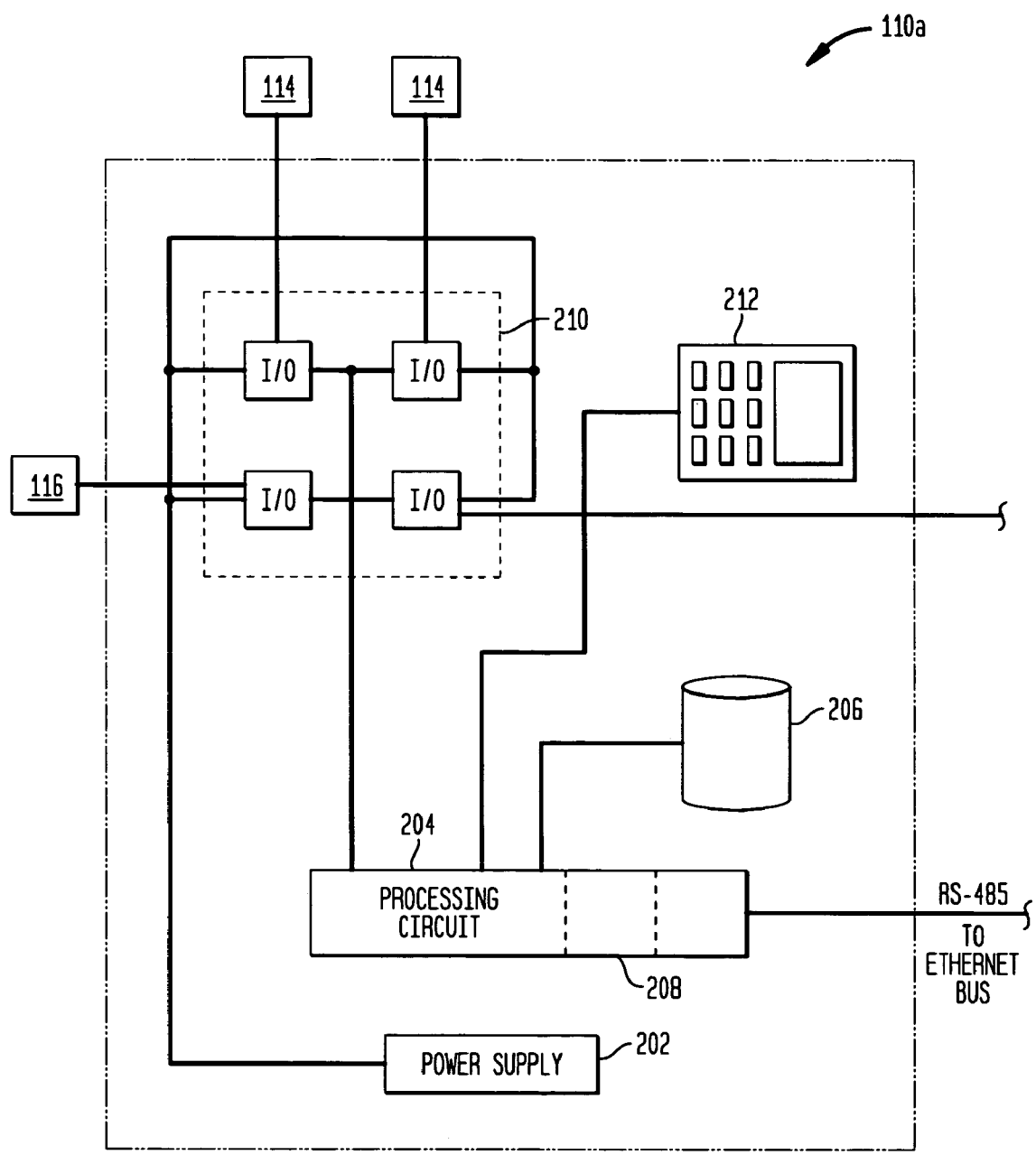
FIG. 2 shows a schematic block diagram of an exemplary field panel that incorporates aspects of the invention.
Figure 3:
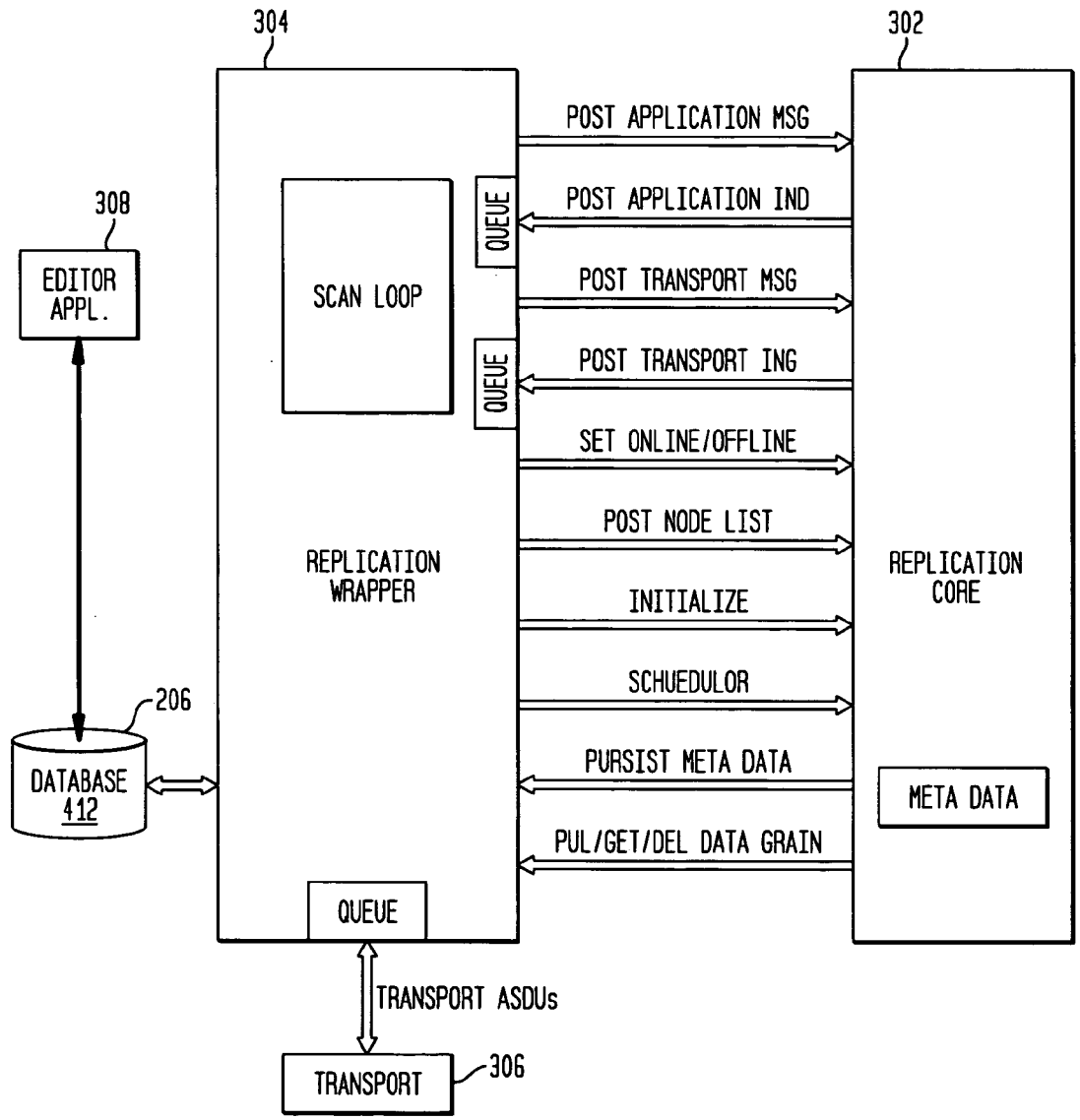
FIG. 3 shows a functional block diagram of software functions executed by the processing circuit of the field panel of FIG. 2, as well as the data store of the field panel of FIG. 2.

FIG. 2 shows an exemplary field panel 110a that incorporates aspects of the present invention and which is also suitable for use as any of the field panels 110b-110d and 112a-112c of FIG. 1. The field panel 110a includes a power supply 202, a processing circuit 204, a data store 206, an Ethernet communication circuit 208, and an I/O circuit 210.

The power supply 202 is a circuit that is operable to convert AC utility power to AC and DC voltages used within the field panel 110a. Such devices are well known in the field panel art. The processing circuit 204 is a circuit that is capable of carrying out a set of instructions to implement the operations ascribed to the processing circuit 204 herein. To this end, the processing circuit 204 may suitably include a microprocessor, a microcontroller, discrete digital circuitry, a programmable logic device, and/or other processing elements, as well as related interface, clocking, and memory circuitry. Suitable circuits in various configurations would be known in the art.

The data store 206 is a memory device or set of memory devices that have the capacity to retain global data shared by all of the field panels in the system 100, and preferably has the capacity to store non-global information specific to the field panel 200 itself. Some field panels may include a hard disk or other non-volatile storage devices, while others only include random access memory or other volatile storage elements.

Under normal conditions, the set of global information stored in the data store 206 is essentially the same data as that stored in the set of global information stored in the data stores of other field panels 110b-110d and 112a-112c. In addition, the global information or global data is typically also stored at the control stations 102, 104.

The type of global data that is stored in the nodes of a system will vary from system to system. In general, global data may include a node list that lists every field panel node and control station node in the BLN. The global data may also include identification of mass storage nodes (i.e. the mass storage device 108) on the BLN, as well as printer nodes (i.e. the printing device 106). The global data may further include user account lists that identify the users having access to the data of the system 100, error message status, global calendar or time-of-year information, and other network connectivity information. Global data may also include various measured data points, set points, or control outputs. For example, global data may include the outside ambient air temperature, or a set point temperature or range for the entire system 100.

It is preferable, however, that the global data does not include every measured value or every set point or output value of the system. The global data maintained in the data store of each field panel should be restricted to avoid unnecessary storage and update communication requirements. In general, global data includes only data that is potentially useful to many or most nodes in the BLN. Such data may include data regarding the setup of the system itself (the node list, printer nodes, mass storage nodes, user accounts) and significant system data for which universal access is advantageous, such as error message status and calendar-related information.

The communication circuit 208 is a circuit that is operable to provide signals to and receive signals from a network bus connection using appropriate physical, transport and network layer protocols. In a preferred embodiment, the communication circuit 208 is operable to use Ethernet physical communications protocols. The physical connection to the network bus may suitably be an RS-485 standard connection. In this example, the network bus is the network 118, as shown in FIG. 1. The communication circuit 208 also includes the TCP/IP transport and network layer functionality that permits the exchange of information on a logical IP network such as the BLN. It is noted that the some of the communication circuit and processing circuit operations may be carried out by one or more shared devices.

The Ethernet and TCP/IP communications protocols are well known in the art. Ethernet protocols generally require that each message from any device connected to the network 118 should propagate to each device on the network 118. While all nodes on the network 118 "see" each message transmitted on the network 118 or bus, only the nodes that are identified as the destination address act upon the message. Moreover, each communication circuit 208 listens on the bus before transmitting messages, and is operable to send a jamming signal if a collision on the bus is detected. Messages addressed to nodes outside the network 118 are intercepted by the router 124, which then retransmits the message to the appropriate destination.

It will be appreciated that the block diagrams of functional blocks of FIG. 2 are largely depicted along functional lines, and that occasionally portions of the same circuit elements may perform portions of multiple functions. For example, as indicated above, the processing elements of the processing circuit 204 may provide at least some of the functionality required to effect the transport and network layer communication functions of the communication circuit 208.

The I/O circuits 210 are ordinary I/O interface devices used to receive signals from various building control devices, and provide signals to various control devices. The I/O circuits 210 may have many configurations, and may include analog signal transceivers as well as digital communication circuit transceivers. Referring to FIG. 1, the I/O circuits 210 include circuits that communicate with the building control devices 114 and 116. The configuration of the I/O circuits 210 can depend upon the device to which the field panel 110a is connected.

The field panel 110a also includes a user interface 212, which may be relatively basic, such as a pushbutton keypad and a small LCD display panel. The user interface 212 allows for a user to locally access global data in the data store 206, as well as local data. The user interface 212 may also allow a user to effect a change to global data. Instead of a user interface 212, or in addition to it, the field panel 110a may include an interface circuit, not shown, that may be connected to a laptop computer or other portable computing device. The field panel may also include a local wireless connection, such as Bluetooth, through which a user may access data via a portable computing device. Such connections are known in the art. Changes to global data may suitably be entered into the field panel 110a through such alternative routes.

The processing circuit 204 is preferably operable to carry out at least some control operations related to the connected building control devices. Such operations constitute the traditional operations of a building control system field panel device and are not discussed herein in detail. The processing circuit 204 is further operable to communicate changes of any of the set of global data to at least one other field panel device via the communication circuit 208. Such changes may be generated within the field panel 110a itself or may be generated by another field panel that communicated the change to the field panel 110a.

To this end, the processing circuit 204 executes a number of software functions. Some of the software functions of the processing circuit 204, as well as supporting hardware circuits, are shown in FIG. 3 in logical block diagram format. In particular, FIG. 3 shows a replication arrangement 300 that includes a replication core function 302, a replication wrapper function 304, a transport function 306, and an editor application 308. Also shown in FIG. 3 is the data store 206. In general, the software functions shown in FIG. 3 operate (through the processing circuit 204) to maintain the global data within the data store 206 and to replicate changes to global data to a set of field panel devices.

Figure 4:
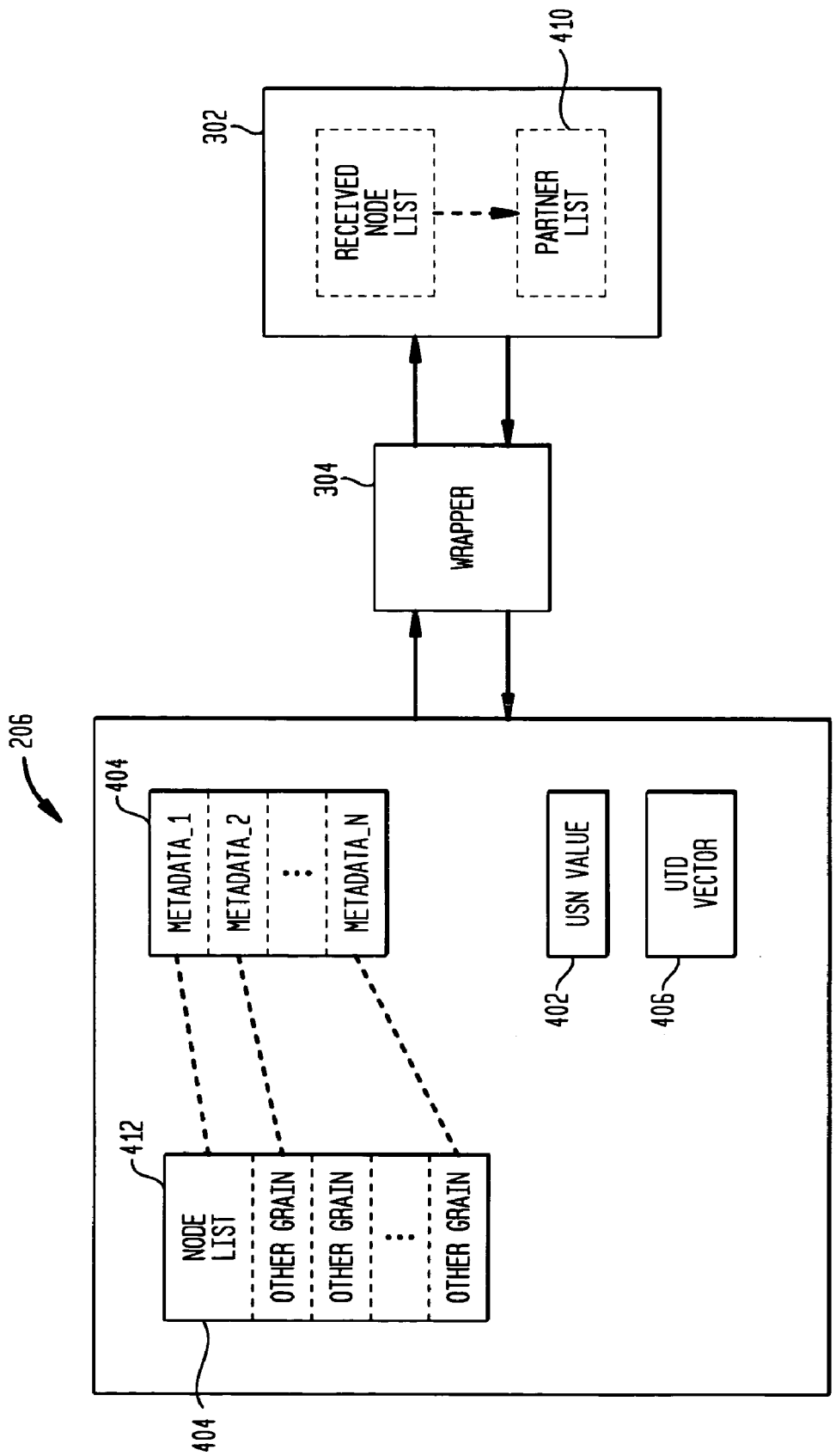
FIG. 4 shows a block diagram the data maintained by a replication function of FIG. 3.

As discussed above, each field panel or other node maintains an instance of the global data. Each instance is referred to as a global data replica. The global data replica in the data store 206 of the node illustrated in FIGS. 2 and 3 is referenced as the local global data replica 412, which is also illustrated in FIG. 4.

The editor application 308 may suitably be one of several user applications that may have the ability to affect the global data. The editor application 308 itself preferably provides for local user interaction with stored data in the data store 206, which is communicated with the operator through the user interface 212. Thus, for example, a user may effect a change to global data through the editor application 308. Such a change could be, for example, manually decommissioning a field panel, which may be the field panel 110a or another field panel. Decommissioning a field panel could affect a global "node list" and/or a global "node status" database. The editor application 308 may also be used to add a name and password for a new operator.

The transport function or layer 306 is the function of the processing circuit 204 that acts as a part of the communication circuit 208. The transport function 306 adds the TCP/IP overhead and maintains address information for the field panel 110a. Such functions would be readily apparent to those of ordinary skill in the art.

The replication core 302 and the replication wrapper 304 cooperate to provide the function that maintains the global data in the data store 206, and coordinates propagation of changes to global data to other field panels or other nodes on the BLN. In the preferred embodiment, the replication core 302 is machine independent, and thus may be used in field panel devices or other nodes having significantly different configurations, such as computer workstations and/or commissioning tools. The replication core 302 defines the functions carried out by each node to maintain global data. In addition to the field panels 110a-110d and 112a-112c, the control stations 102 and 104 may include the same replication core function. The replication wrapper 304 is a machine-specific wrapper function that interfaces between the replication core 302 and the specific structures/configuration of the field panel 110a.

Further details regarding the replication core 302 and wrapper 304 are provided below in connection with FIGS. 4, 5, 6, 7 and 8. The precise configuration of the wrapper 304 will necessarily depend on details of implementation of portions of the field panel 110a which are beyond the scope of the invention. However, those of ordinary skill in the art may readily provide a wrapper function that carries out the functions described herein and which suits their particular hardware configuration.

In general, the replication core 302 of each node of the BLN of FIG. 1 causes each node to perform replication-related operations in a consistent manner. These operations include:

1) Each node communicates a change in global data to select partner node(s);

2) Each node determines node partners using the same algorithm;

3) Each node maintains "version numbers" (metadata) for each replica update received, as well as global data piece or grain, so that outdated global data within each node may be identified;

4) Each node tracks its own overall version number (Update Sequence Number or USN) of the entire data set (replica) so that the propagation of updates can readily converge.

To this end, the replication core 302 of each node maintains certain information necessary to carry out these functions. FIG. 4 shows a block diagram of the data maintained by the replication core 302 and/or generated by the replication core 302. In general, the replication core 302 maintains most data in the data store 206 (or in any event, one or more memory devices). The replication core 302 accesses the data store 206 through the replication wrapper 304.

The replication core 302 maintains and uses the following data blocks, a USN value 402, a grain metadata table 404, an up-to-dateness ("UTD") vector 406. The replication core 302 also from time to time generates a partner list 410. The replication core 302 generates the partner list 410 using a current node list 408. The node list 408 is one of the global data grains, as will be discussed below. It will be appreciated that various other data blocks may be maintained in the data store 206 for use by the replication core 302.

FIG. 4 also illustrates the current instance of global data or replica 412. The replica 412 contains a plurality of data grains 408, 412a, 412b and so forth. A data grain is an updatable portion of the replica. In some cases, a data grain can be an entire database. In such a case, every update to that database requires replacement of the entire database. In other cases, a data grain constitutes only a portion of the database. It will be appreciated that the replica 412 may suitably include multiple databases, with each database having one or more grains. By way of example, the data grain 408 is the node list which identifies each node in the BLN.

In the embodiment described herein, the replication core 302 preferably does not directly access or maintain the global data in the replica 412. Instead, the current instance of global data or replica 412 is stored in the data store 206 and is preferably accessed through the replication wrapper 304. Thus, the replication core 302 need not have any system specific information regarding the structure of the replica databases in the data store 206, nor the physical configuration of the data store 206. As a consequence, the replication core 302 may be the same, regardless of whether implemented on a field panel, a computer work station, or variations of field panels and work stations.

Referring again to FIG. 4, the USN value 402, as briefly described above, is a counter that is incremented each time the replica 412 is updated. As will be discussed below, the USN value 402 may be used to converge on the complete propagation of updates throughout the BLN. By way of example, each node that originates an update to the global data replica sends its USN along with the update information. As a particular update propagates, nodes can determine whether to propagate a particular update any further using the information identifying the originating node's USN.

For example, if potential source node and a potential destination node both include metadata that includes the USN of the node that originated a particular change, the source node will not propagate that change to the destination node. The USN of the originating node of each global data update is tracked in each node's UTD vector 406, which is discussed below.

The UTD vector 406 is a table or similar structure that essentially identifies the changes to the replica 412 that have occurred. The UTD vector 406 may suitably identify for each change: 1) identification of the node that originated each change, 2) the USN of the originating node when the change was originated, and 3) the data grains that were updated. The UTD vector 406 may be used by the replication core 302 to determine whether to propagate new changes to another node, or, in alternative embodiments, to accept changes from another node. If the UTD vector 406 of the local node is the same as the UTD vector of a partner node, then the local node will not propagate any update to the partner node. The UTD vector 406 is thereby used to converge the propagation of changes. The UTD vector 406 forms part of the metadata of the replica 412.

The grain metadata table 404 consists of a number of metadata values. The grain metadata values identify the "version" of each particular data grain in the replica 412. The grain metadata table 404 is used in some circumstances to resolve conflicts between multiple contemporaneous updates to the same global data grains. The grain metadata values for each grain are not node specific but rather are ideally the same in all the nodes. In other words, in an ideal situation in which all nodes have identical global data replicas, all nodes will have the same grain metadata values as well.

As discussed above, the node list 408 forms one of the data grains of the global data replica 412 stored in the data store 206. The node list 408 identifies the peer nodes that are present on the logical BLN. The replication core 302 from time to time obtains the node list 408 via the replication wrapper 304 in order to determine its replication partner nodes. As discussed briefly above, replication partners are the subset of BLN nodes that the node communicates with for the purpose of global data replications.

To determine replication partners, the replication core 302 first receives the node list 408 from the global data replica 412 via the replication wrapper 304. The replication core 302 then employs an algorithm that divides the node list into groups of partners for each node or member of the BLN. The replication core 302 thus generates a partner list 410 for the local node in which it is located. When generating the partner lists, the node list 408 is preferably divided into partner groups such that all nodes are connected through a few hops, for example, three hops. Various algorithms may be employed to ascertain that changes propagate through the partner configuration within a specified number of "hops". All replication cores 302 of all the nodes in the BLN use the same algorithm, and thus all ideally determine the same partner lists for each partner. Further information regarding one exemplary method of calculating partners is provided below in connection with FIG. 8.

As discussed above, the partner list 410 identifies the partners of the local node in which the replication core 302 is located. The replication core 302 uses the partner list 410 to propagate update information to its partner nodes.

Referring again to FIG. 3, the replication arrangement 300 cooperates to carry out a number of replication-related functions. Such functions include the propagation of a change in global data to partner nodes, the restoration of a replica of an existing node, and the addition of a new node to the BLN.

Figure 5:
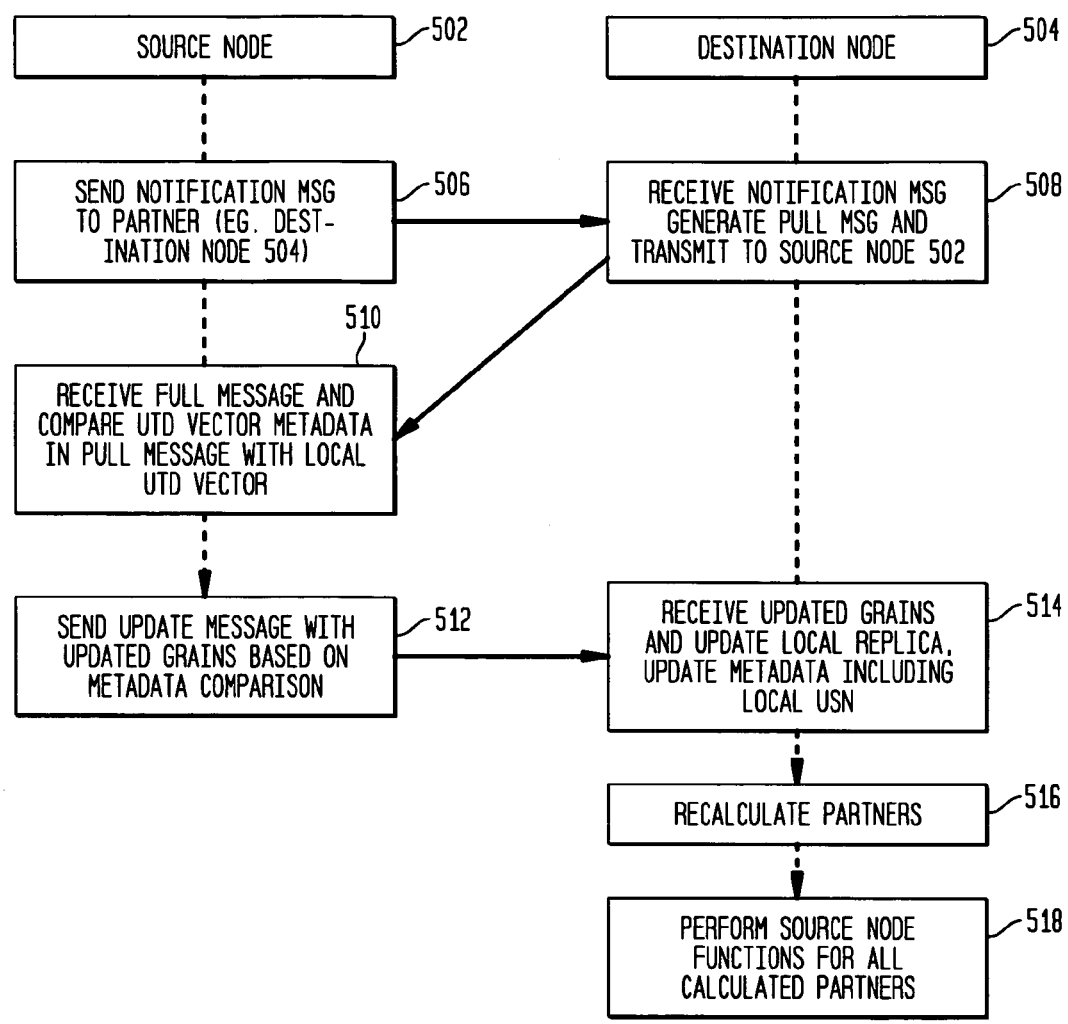
FIG. 5 shows a flow diagram of operations performed by nodes on the network to propagate a global data update.

FIG. 5 shows a flow diagram of the operations of the replication arrangements 300 of a source node 502 and destination node 504 that are carried out to propagate a change or update to global data. The source node 502 and the destination node 504 may suitably be any of nodes 102, 104, 110a-110d or 112a-112c of FIG. 1. The operations of FIG. 5 are carried out by combinations of the elements of the replication arrangement 300 of each of the source node 502 and the destination node 504. Further detail on how the replication core operates to carry out the replication operations is provided below in connection with FIG. 8.

Referring to the operations of FIG. 5, it will be appreciated that the source node 502 may or may not be the node that originated the update, or originating node. Updates to global data may, for example, be originated from local changes to the global data effected by the editor application 308. A change in global data may also be originated when a new node is added to the BLN, such as is discussed below in connection with FIG. 7. The source node 502 in FIG. 5 may either be the originating node, or may instead be a node that merely passes on an update that was originated elsewhere.

The destination node 504 is one of the partner nodes of the source node 502. The source node 502 carries out the steps of FIG. 5 with each of its other partner nodes as well. In the operations of FIG. 5, it is assumed that the source node 502 has an update (originated there or elsewhere) to one or more grains of its replica (element 412 of FIG. 4) to propagate.

In step 506, the source node 502 sends a notification message to the destination node 504. The notification message identifies to the destination node 504 that the source node 502 has an update to propagate. As discussed above, the originating node may be the source node 502 itself. In other cases, however, the originating node is another node and the update has been previously received by the source node 502 through a process similar to that shown in FIG. 5.

In step 508, the destination node 504 receives the notification message. The destination node 504 generates a pull message and sends the pull message to the source node 502. The pull message includes the metadata values of the destination node 504. The metadata values include sufficient values to identify at least in part the current state of the replica of the destination node 504. In the embodiment described herein, the metadata values include, among other things, the UTD vector (e.g. UTD vector 406) of the destination node 504.

In step 510, the source node 502 receives the pull message and processes the metadata values of the destination node 504 that are contained within the pull message. In particular, the source node 502 compares the destination node metadata values with the stored source node metadata to determine which, if any, metadata values of the destination node 504 are not up to date. The destination node metadata values that are not up to date correspond to grains of global data of the destination node 504 that need to be updated.

In the embodiment described herein, the source node 502 compares the UTD vector of the destination node 504 with the locally-stored UTD vector of the source node 502. A comparison yields a result that identifies any updates that the destination node 504 has not received. If the UTD vectors of the source node 502 and destination node 504 are identical, then there is no need to propagate the change from the source node 502 to the destination node 504 as the destination node 504 has already received that change. If the source node 502, however, has a new change, then the destination node 504 will not have a record of that update in its UTD vector, and the source node 502 will determine that the update should be provided.

It will be appreciated that other methods of determining whether the destination node requires an update may be employed. For example, the decision to update grains of global data may alternatively be based on a comparison of the source and destination grain metadata instead of the UTD vector. In the embodiment described herein, however, the grain metadata values from the grain metadata table 404 are used to resolve any conflicts, as discussed above. A conflict may arise if two nodes update the same data grain locally at about the same time. In such a case, each node (such as the destination node 504) uses the time or version stamp, which is part of the grain metadata, and adopts the latest version. All nodes use the same conflict resolution process and will thus all adopt the same grain.

Referring again to the general description of FIG. 5, the source node 502 executes step 510 after comparing its metadata to the metadata of the destination node 504. IN step 510, the source node 502 generates a replication update message containing updated grains of global data that were determined to require an update in step 510. The source node 502 also includes within the replication update message the new metadata values. In step 514, the destination node 504 receives the updated grains of data and the corresponding metadata values. The destination node 504 stores the new global data updates and increases its own USN value, which thus indicates that the destination node 504 has a new replica 412. The destination node 504 furthermore updates its metadata table 404 and UTD vector 406 (see FIG. 4) using the transmitted new metadata values.

In step 516, the destination node 504 recalculates partners and provides the newly calculated partners of the destination node 504 to the partner list (element 410 of FIG. 4). If no changes have been made to the node list global data in step 514, then the destination node 504 need not perform step 516. However, it may be preferable to always recalculate partners before further replication. As discussed above, the destination node 504 uses the same algorithm to calculate partners as all other nodes. Accordingly, the partner list generated in step 516 should correspond to substantially all the partner lists generated in other nodes of the network.

In step 518, the destination node 504 operates to propagate the replication update to its other partner nodes by becoming a source node and performing step 506 from the perspective of the source node 502.

In the above described manner, the various nodes receive updates and pass the updates on to their partner nodes until the entire BLN has received the update. Each receiving node becomes a source node for another set of nodes, and so forth. When all of the nodes have received the same update, the nodes stop passing the update forward.

While the above describe method ideally ensures that all nodes on the BLN eventually have identical global data, there are circumstances in which this is temporarily not the case. Once such case is where a node loses some or all of its global data, and does not have either or both of a recent replica and/or USN. Such a problem may be identified in the comparison of UTD vectors in the operation of step 510 of FIG. 5. More likely, however, a loss of data follows a power down of the node or from taking the node off-line. In the case of a restart or restoration of a node, the node automatically seeks to update its replica, and may determine that it needs to update its USN.

Figure 6:
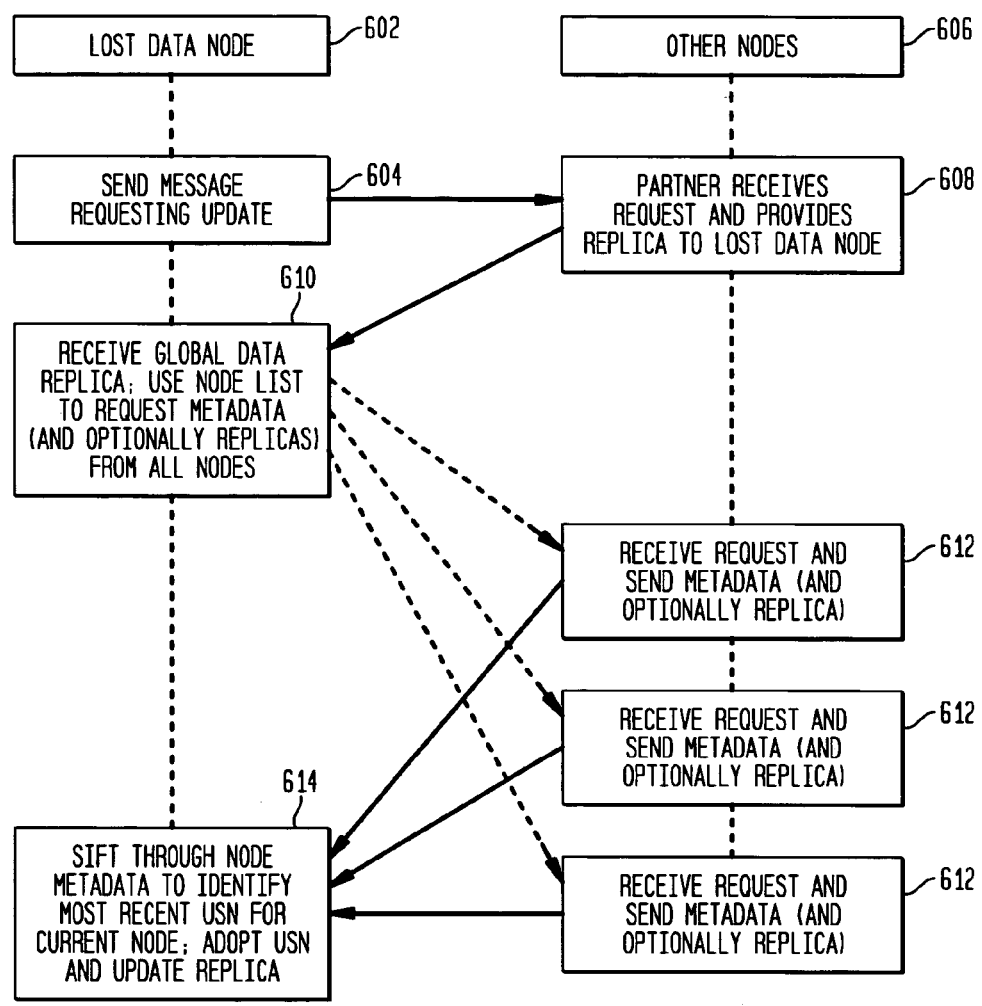
FIG. 6 shows a flow diagram of operations performed by nodes on the network under a condition in which one of the nodes is determined to have lost global data.

FIG. 6 shows a set of operations that carry out the above operations to restore a node that has lost global data information, or has at least missed several updates. As discussed above, such lost global data may result from the node 602 being taken off-line, from the node 602 being powered down, or from a memory loss. FIG. 6 also shows the operations of the other BLN nodes, identified generically as a group of other nodes 606, in the operation of restoring the replica of the node 602.

Step 604 is typically automatically performed upon "cold start" or other restoration of a node that was previously on the BLN. In step 604, the cold start or lost data node 602 requests an update or restoration from one of its partner nodes. Step 604 is therefore similar to the pull message generated in step 508, and thus may include any metadata known to the restoring node 602. The other (partner) node 606 in step 608 receives the request and provides an update to the node 602 using the normal operations shown in FIG. 5. Under normal circumstance, the node 602 receives the update message and updates its replica accordingly.

The node 602 may also restore its USN value from the update message. The update message typically includes the UTD vector of the other (partner) node 606. The node 602 may restore its own USN value by identifying the most recent change originated by itself, which change would have been recorded in the received UTD vector. The record of the most recent change includes its own USN value at the time of the change. The node 602 may adopt that most recent USN value as its current USN, or may derive its current USN from the most recent USN and one or more other factors.

However, under rare circumstances, the node 602 may discover a conflict in metadata during restoration. For example, an operator might edit global data at the node 602, which leads to creation of metadata (i.e. a UTD vector) that conflicts with data originated by the same node at a prior time its USN counter had a different value. In such a case, it may be preferable to initiate special replication transactions (step 612) with all other nodes 606 (not just partners) on the BLN. These transactions allow the node 602 to re-learn all global data it ever originated and achieve global data convergence. The node 602 re-learns all global data it ever originated by receiving global data and UTD vectors from all other nodes 606 in step 614 and sifting through the UTD vectors of the received data for changes originated by the node 602.

The operations of FIG. 6 thus provide a method by which global data and the associated counters may be automatically restored on a node that loses its memory for some reason. The operations of FIG. 6 are especially valuable in systems that may include nodes that have primarily volatile memory for global data, such as RAM. The operations of FIG. 6 may also be used when replacing the hardware of the node.

Figure 7:
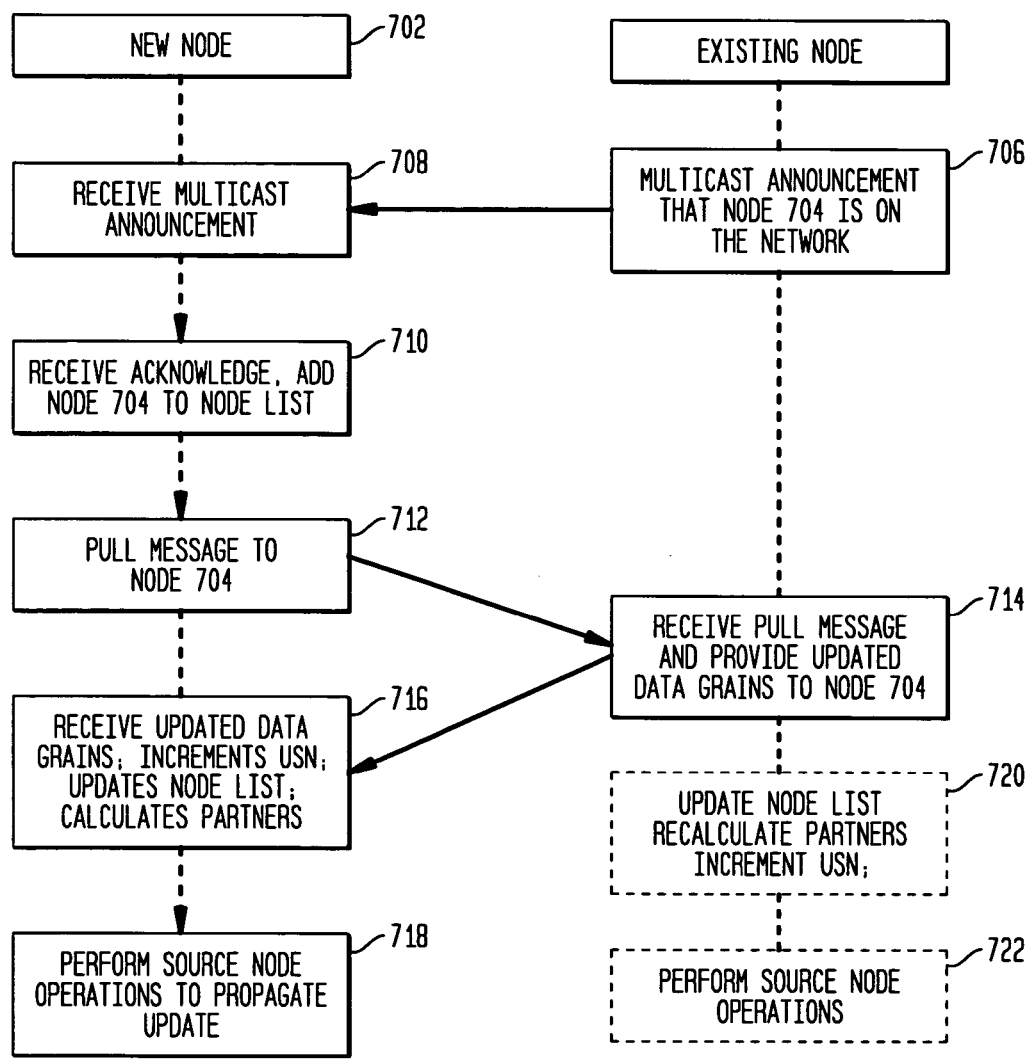
FIG. 7 shows a flow diagram of operations performed by nodes on the network to add a new node to the network.

Another capability of at least some embodiments of the replication arrangement 300 according to aspects of the invention is the ability to be added to the BLN. FIG. 7 shows two nodes carrying out an operation in which a new node 702 is added to the BLN. The BLN already includes an existing node 704. Similar to the nodes of FIGS. 5 and 6, both nodes 702, 704 have the same replication core program, which is shared preferably by all nodes on the BLN.

Typically, a new node is discovered when an existing node sends out a multicast identification message. In particular, from time to time, each existing node on a BLN sends out an identification multicast message to notify other nodes (on its particular LAN) that it is on the network. Any new nodes connected on the same LAN (or otherwise coupled to receive multicast messages) is configured to receive and act on such a message. Accordingly, it will be assumed that the new node 702 is configured to receive multicast messages from the existing node 704.

Referring now to the specific operations of FIG. 7, in step 706, the existing node 704 generates an identification multicast message to the LAN on which it is connected. The multicast message includes an identification that the existing node 704 belongs to the logical BLN. Typically, the multicast message will not propagate through a router. As a consequence, the multicast message is only received by other nodes on the same local area network of the existing node 704. For example, referring to FIG. 1, if the node 112c of FIG. 1 generates the multicast message, then the multicast message generated in step 706 will only reach nodes on the LAN 120, including nodes 112a and 112b.

The new node 704 then receives the multicast message in step 708. Then, in step 710, the new node 702 adds the existing node 704 to its node list 408 (see FIG. 4).

The new node 702 then, in step 712, generates a "pull" message to obtain a global data replica from the existing node 704. As with the pull message discussed above in connection with step 508 of FIG. 5, the pull message includes the metadata values of the new node 702. Because the new node 702 typically has no global data replica, the metadata values are often null. However, in the event that the new node 702 has been preconfigured using default global data or an initial replica generated by the application layer 308 (see FIG. 3), the metadata values may be non-zero. Nevertheless, most or all of the metadata values of the new node should indicate that an update is necessary. In any event, the existing node 704 receives the "pull" message and provides global data grain updates in a method similar to that of step 510 of FIG. 5.

In step 714, the existing node 704 receives the pull message and provides the updated global data grains to the new node 702. To this end, the existing node 704 performs operations similar to 510 and 512 of FIG. 5.

Thereafter, in step 716, the new node 702 receives the updated global data grains and performs the operations of steps 514, 516 and 518 discussed above. Thus, the new node 702 stores the global data grains, and updates its node list. With the updated node list, the new node 702 calculates its partners.

Once its partners are calculated, the new node 702 in step 718 performs the steps of the source node 502 of FIG. 5 in order to propagate the new update it originated, namely, the addition of itself, to other nodes of the BLN. As a consequence, the new node 702 thus propagates its addition to the BLN itself, after its global data and node list are instantiated through the start-up operations of steps 706-716 discussed above. It is noted that the only update required by the partners of the new node 702 may be the node list in the global data.

Optionally, the addition of the new node 702 may be propagated by the existing node 704. In such an option, in step 720, the existing node 704 would first update its node list, increments its node USN, and recalculates its partners. Then, in step 722, the existing node 704 would perform the steps of the source node 502 to notify its partners of the update. It is noted that step 722 may be performed in addition to, or instead of, step 718. In other words, either or both of the existing node 704 and the new node 702 may initially propagate the update announcing the addition to the node 702 to the BLN.

Thus, the above steps show an example of how a new node may be automatically instantiated or integrated into the BLN, and be brought up to date on global data. The operations of FIG. 7 differ from the operations of FIG. 6 in that the operations of FIG. 6 address recovery of global data by an existing node that encounters a data loss, while FIG. 7 relates to automatically implementing a new node on the BLN.

Most of the steps described above in FIGS. 5 through 7 are programmed as part of the replication core 302. By contrast, the wrapper 304 adapts the functions described above to the physical and specific software platform of the field panel 300, computer work station, or other device. The physical and software platform of the field panel may vary in a number of ways, including, by way of example, the type of memory 206 used to store the database, or operating system. The wrapper 304 also handles the communication interface between the replication core 302 and the transport layer 306.

Referring again to FIG. 3, during normal operation, the wrapper 304 performs the functions described below. In general, the wrapper 304 1) receives externally-generated global data-related messages from the transport layer 306 and provides the relevant information to replication core 302, 2) generates outgoing global data-related messages based on commands/messages generated by the replication core 302, 3) stores, erases or retrieves global data grains based on global data updates generated by the replication core 302, and 4) performs other housekeeping operations for the replication core 302.

For incoming transport messages, the wrapper 304 receives incoming message to a queue 320 or set of queues. The wrapper 304 subsequently removes any machine-specific communication information that has not already been removed by the transport layer 306 and provides the machine-independent message to the replication core 302. As discussed above in connection with FIGS. 5-7, incoming messages can include, among other things, a "notification", a "pull" or a "replication update".

The outgoing messages that are typically generated by the replication core 302 similarly can be "notification", "pull" or "replication update" messages. The wrapper 304 receives an outgoing message from the replication core 302 and queues the outgoing message. The replication core 302 specifies the type of message, and the destination. The wrapper 304 subsequently provides the message to the transport layer 306 in the format expected by the transport layer 306. The transport layer 306 then sends the message out to the intended destination on the BLN.

As discussed above, at least some incoming transport messages contain global data grains that should be stored in the local replica 412 in the data store 206. Such messages are received and passed by the wrapper 304 to the replication core 302. The replication core 302 then provides any updated global data grains to the wrapper 304. The wrapper 304 stores the updated grains in the data store 206. Similarly, if the replication core 302 determines that it needs to propagate at least some grains of the local replica 412 to another node, then the replication core 302 requests the specific grains from the data store 206 through the wrapper 304.

The replication core 302 preferably never "decyphers" the global data grains, but just passes the grains as they are received. Because the replication core 302 merely passes data grains as packages, older versions of field panels may replicate updates for types of global data that are supported only by newer field panel devices. The older devices replicate the data grains of unknown type and store the data grains in the replica without "unpacking" them.

In any event, the precise function of the wrapper 304 depends on the configuration of the field panel, or the work station or other physical host of the node. Those of ordinary skill in the art may readily adapt the above described functions of the wrapper 304 to suit their field panel configuration.

Figure 8:
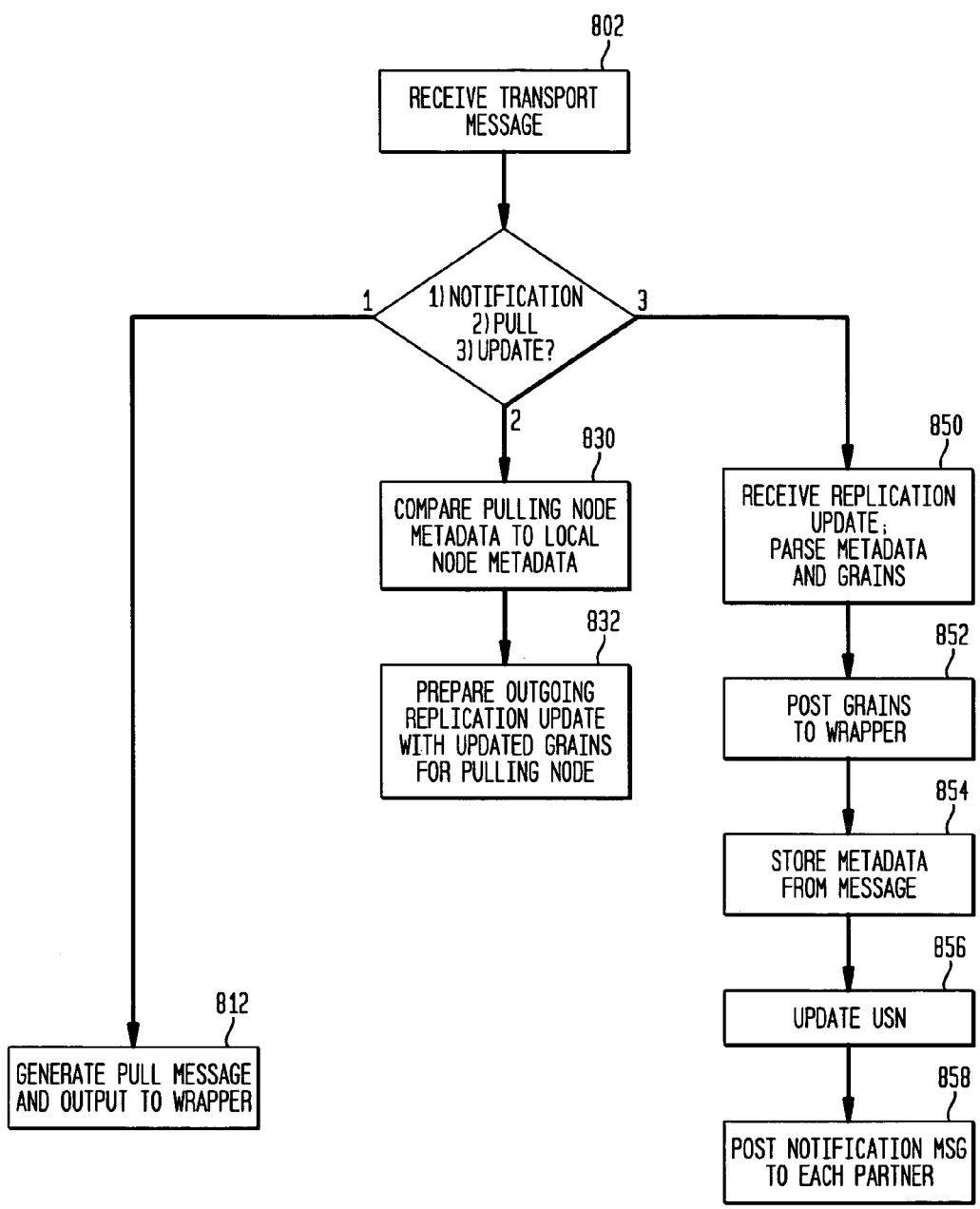
FIG. 8 shows a flow diagram of operations performed by the replication core of FIG. 3.

As discussed above, the replication core 302 is preferably machine-independent, and carries out the basic replication functions. FIG. 8 shows a flow diagram an exemplary set of operations that are carried out by the replication core 302. The operations of FIG. 8 relate primarily to ordinary replication functions communicated with other nodes on the network, such as "notification", "pull", and "replication update" messages described further above.

The notification, pull and replication update messages are all inter-node messages, or transport messages. Referring to FIG. 8, transport message are received into the replication core 302 in step 802. The replication core 302 then performs the operations starting at step 812 if the message is notification message, performs the operations starting at step 830 if the message is a pull message, and performs the operation of step 850 if the message is a replication update message.

In step 812 (notification message), the replication core 302 generates a pull message. More specifically, the replication core 802 generates an outgoing pull message and posts it to the wrapper 304 for transport to the source node (i.e. the node that sent the Notification message, which may or may not be the originating node). The pull message includes information identifying the source node to which it is to be transported, and information including the local metadata (including at least UTD vector 406 and typically also the grain metadata 404 of FIG. 4). As discussed above, the local metadata chronicles the version information and/or update history for the grains of data in the local global data replica 412.

The replication core 302 then awaits further information, for example, a transport message that includes a replication update message from the source node, which would be received through the wrapper 304. It will be appreciated that step 812 (generation of pull message) may occur even without receiving a notification message from another node. For example, the replication core 802 may periodically send out an unsolicited pull message to ensure that its global data replica is up to date.

Referring again to step 802, if the received transport message constitutes a pull message, then the replication core 302 proceeds to step 830. In step 830, the replication core 302 parses out the pulling node's metadata from the transport message and compares the pulling node metadata to the local node metadata 404 and/or 406 (see FIG. 4). Such a comparison allows the replication core 302 to determine whether any grain of the pulling node replica is an outdated version as compared to the corresponding grain within the local replica 412. If so, then replication core 302 in step 832 prepares an outgoing replication update message that includes any grains of global data for which the pulling node's metadata is obsolete. The outgoing replication update message also includes the local metadata values corresponding to the grains being updated.

Referring again to step 802, another type of transport message is a replication update message that contains grains of global data to be updated in the local node. As discussed above, the replication core 302 executes step 850 when a replication update message is received.

In step 850, the replication core receives the replication update message and parses the containers of the grains of updated global data within the transport message, and also parses the metadata values corresponding to those grains. As discussed above, replication update messages typically also include the metadata values corresponding to the update. In step 852, the replication core 302 posts the updated grains to the wrapper 304 so that the wrapper 304 can write the new data to the data store 206. In step 854, the replication core 304 updates the local metadata table 404 and UTD vector 406 (see FIG. 4). The UTD vector 406 contains a new record that identifies the global data updated, the originating node of the update, and the USN of the originating node. The local metadata table 404 contains new version information for the updated data grains.

In step 856, the replication core 302 updates the local node's USN to indicate that the local node has a new version of the global data. Thereafter, in step 858, the replication core 302 generates one or more notification messages to be sent to its replication partners. Step 858 represents the further propagation of the update. The replication core 302 posts the generated notification message(s) to the wrapper 304, which, in turn, facilitates transmission of the notification messages to specified partner nodes.

It is noted that the above steps show the basic operations of the replication core 302. However, the replication core 302 may suitably perform other operations as well. As discussed above, the replication core 302 also from time to time will simply send out a pull message to its partners, even without receiving a notification message. The periodic Pull messages may suitably be prompted by a housekeeping function of the wrapper 304.

As discussed above, the replication core 302 uses the same partner calculation algorithm as the replication core of every other node in the network. One exemplary algorithm that may be used involves 1) ordering the nodes alphabetically and indexing the nodes; 2) given n nodes, let r be the cube root of n, and partition the nodes into rxr cliques; 3) add a link between each pair of cliques. The resultant graph provides an assignment that satisfies the three-hop rule because given any two nodes, and the two cliques to which they belong, it takes one hop to go between the two cliques, one hop for the first node to reach any node in the first clique, and one hop for the second node to reach any node in the second clique. Other algorithms which satisfy the three-hop rule may be employed.

The above implementation includes several features that provide advantages to implementation of a logical IP network for building automation system field panels. At least some features described above provide advantages independent of the other features, and thus some features may be implemented without the others and still obtain at least some advantages over prior art arrangements.

Moreover, it will be appreciated that the above described embodiments are merely exemplary, and that those of ordinary skill in the art may readily devise their own adaptations and implementations that incorporate the principles of the present invention and fall within the spirit and scope thereof.

We claim:

1. An arrangement in a building control system, comprising:
    a plurality of field panel devices, each field panel device configured to receive control inputs and further configured to provide control outputs to at least one building control device, each field panel device further comprising:
    a data store maintaining a set of global data, the set of global data shared by all field panel devices;
    an Ethernet communication circuit operably connected to others of the plurality of field panel devices;
    a processing circuit configured to communicate changes of any of the set of global data to at least one other field panel device via the Ethernet communication circuit.

2. The arrangement of claim 1 wherein the processing circuit is configured to communicate changes to any of the set of global data to at least one other field panel device that is located on another Ethernet network via a router.

3. The arrangement of claim 1 wherein each field panel device is a node on a subsystem, and wherein the data store further maintains the set of global data such that the set of global data includes a list of the nodes in the subsystem.

4. The arrangement of claim 3 wherein the data store further maintains the set of global data such that the set of global data includes identification of one or more mass storage nodes in the subsystem.

5. The arrangement of claim 1 wherein each field panel device is a node on a subsystem, and wherein the data store further maintains the set of global data such that the set of global data includes a list of user accounts having access to at least portions of the subsystem.

6. The arrangement of claim 1 wherein each field panel device is a node on a subsystem, and wherein the data store further maintains the set of global data such that the set of global data includes a list of error messages generated by the nodes in the subsystem.

7. The arrangement of claim 1 wherein the data store further stores information regarding a set of prior updates to the set of global data.

8. The arrangement of claim 1 wherein the processing circuit is configured to execute software functions, the software functions including a replication function, the replication function configured to identify the at least one other field panel device to which changes to of any of the set of global data are to be communicated.

9. The arrangement of claim 8 wherein each field panel device has the same replication function, the replication function being machine independent.

10. The arrangement of claim 9 wherein the software functions further include a wrapper function, the wrapper function operably communicating information between the replication function and the Ethernet communication circuit, the wrapper function being machine dependent.

11. The arrangement of claim 1 wherein the data store includes volatile memory such that at least some global data is lost if power is removed from the memory.

12. The arrangement of claim 1, further including stored programming instruction causing the processing circuit to cause communication of changes of any of the set of global data to at least one other field panel device via the Ethernet communication circuit.

13. An arrangement in a building control system, comprising:
    a field panel device configured to receive control inputs and further configured to provide control outputs to at least one building control device, the field panel device further comprising:
    a data store maintaining a set of global data, the set of global data shared by a number of other field panel devices, the number of other field panel devices operably coupled through a logical internet protocol network;
    a logical protocol network communication circuit operably connected to at least one of the number of other field panel devices;
    a processing circuit configured to communicate changes of any of the set of global data to at least one other field panel device via the logical internet network communication circuit.

14. The arrangement of claim 13 wherein the field panel device is a node on the logical internet protocol (IP) network, and wherein the data store further maintains the set of global data such that the set of global data includes a list of the nodes in the logical IP network.

15. The arrangement of claim 14 wherein the data store further maintains the set of global data such that the set of global data includes identification of one or more mass storage nodes on the logical IP network.

16. The arrangement of claim 13 wherein the field panel device is a node on the logical internet protocol (IP) network, and wherein the data store further maintains the set of global data such that the set of global data includes a list of user accounts having access to at least portions of the logical IP network.

17. The arrangement of claim 13 wherein the field panel device is a node on the logical internet protocol (IP) network, and wherein the data store further maintains the set of global data such that the set of global data includes a list of error messages generated by the nodes in logical IP network.

18. The arrangement of claim 13 wherein the data store further stores information regarding a set of prior updates to the set of global data.

19. The arrangement of claim 13 wherein the processing circuit is configured to execute software functions, the software functions including a replication function, the replication function to identify the at least one other field panel device to which changes to of any of the set of global data are to be communicated.

20. The arrangement of claim 13 wherein the processing circuit further includes a transport layer function configured to effect communications using TCP/IP transport layer protocol.

21. The arrangement of claim 19 wherein the replication function is machine independent.

22. The arrangement of claim 19 wherein the replication function is configured to receive metadata from another field panel, and determine based on that metadata whether an update in the global data in at least one field panel is necessary.

23. A method of adding a new node to a logical network, the logical network including a plurality of existing nodes, each of the existing nodes including a memory device storing global data, the method comprising:
 a) transmitting from a first node of the plurality of existing nodes a first message identifying the first node as a member of the logical network;
 b) receiving the first message at the new node, and transmitting from the new node to the first node a request for global data;
 c) transmitting to the new node from the first node global data stored at the first node; and
 d) determining a first set of partner nodes at the new node, the first set of partner nodes comprising a subset of the plurality of nodes.

24. The method of claim 23 wherein step b) further comprises adding to a node list at the new node information identifying the first node.

25. The method of claim 23 wherein the global data includes a node list identifying the plurality of nodes.

26. The method of claim 25 further comprising e) propagating to the plurality of nodes a global data update including information identifying the addition of the new node.

27. The method of claim 23 wherein the new node comprises a field panel employed in a building automation system.

28. The method of claim 27 wherein the new node comprises a field panel employed in an HVAC system.

29. The method of claim 27 wherein at least one node of the plurality of nodes includes a computer work station.

30. The method of claim 29 wherein the first message is a multicast message that is received by less than all of the plurality of nodes and the new node.

31. An arrangement in a building control system, comprising:
 a plurality of field panel devices, each field panel device configured to receive control inputs and further configured to provide control outputs to at least one building control device, each field panel device further comprising:
 a data store maintaining a set of global data, the set of global data shared by all of the plurality of field panel devices;
 a communication circuit operably connected to others of the plurality of field panel devices; and
 a processing circuit configured to communicate changes of any of the set of global data to at least one other field panel device via the communication circuit, the processing circuit further configured to maintain version information regarding the global data.

32. The arrangement of claim 31 wherein the global data comprises a plurality of grains, and wherein the version information includes metadata corresponding to each of the plurality of grains.

33. The arrangement of claim 30, wherein the processing circuit is further configured to increment a field panel replica version number each time global data is updated.

34. The arrangement of claim 31, wherein the global data comprises information regarding a plurality of prior global data updates.

35. The arrangement of claim 34, wherein the information regarding a plurality of prior changes includes information identifying for each of a set of prior global updates, an identification of one or more grains updated and an identification of a node that originated the global data update.

* * * * *